(12) United States Patent
Grolemund et al.

(10) Patent No.: US 6,387,997 B1
(45) Date of Patent: May 14, 2002

(54) SOLVENT-FREE FILM-FORMING COMPOSITIONS, COATED SUBSTRATES AND METHOD RELATED THERETO

(75) Inventors: Mary E. Grolemund, Sarver; Masayuki Nakajima, Wexford; Thomas R. Hockswender, Gibsonia; Kurt G. Olson, Gibsonia, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/437,617

(22) Filed: Nov. 10, 1999

(51) Int. Cl.[7] .................. C08F 283/12; C08G 77/44; C08L 83/10; C08L 33/00; C09D 183/10
(52) U.S. Cl. .................. 524/506; 524/457; 524/588; 525/100; 525/102; 525/374
(58) Field of Search ................. 524/457, 506, 524/588; 525/100, 102, 374

(56) References Cited

U.S. PATENT DOCUMENTS

| | | | |
|---|---|---|---|
| 5,071,904 A | | 12/1991 | Martin et al. ............... 524/458 |
| 5,202,368 A | * | 4/1993 | Davis et al. ............... 524/266 |
| 5,379,947 A | | 1/1995 | Williams et al. ............ 241/21 |
| 5,399,612 A | | 3/1995 | Calhoun .................... 524/506 |
| 5,426,151 A | * | 6/1995 | Brandt et al. .............. 525/100 |
| 5,910,563 A | | 6/1999 | Jones et al. ............... 528/272 |
| 5,948,849 A | * | 9/1999 | Porter ..................... 524/506 |

FOREIGN PATENT DOCUMENTS

| | | | |
|---|---|---|---|
| CA | 2203868 | 4/1997 | ......... C09D/175/04 |
| EP | 0 635 526 A1 | 1/1995 | |
| JP | 02308801 A | * 12/1990 | ................ 524/460 |
| JP | 11071527 A | * 3/1999 | ......... C08L/101/08 |
| WO | WO 92/14788 | 9/1992 | |

OTHER PUBLICATIONS

Kreis, Winifried, "Meeting Requirements for Automotive Primer–Surfacer and Clearcoat", Powder Coatings, Dec. 1998, pp. 12+.

Dr. W. Kries, Aktueller Status bei der Pulverlackentwicklung fur die Automobilindustrie am Beispiel fuller und Klarlack, presented by at the 1st International Conference of Car–Body Powder Coatings, Berlin, Germany, Jun. 22–23, 1998, reprinted in Focus on Powder Coating, The Royal Society of Chemistry, 2–8, Sep. 1998.

* cited by examiner

Primary Examiner—David W. Wu
Assistant Examiner—Kelechi Egwim
(74) Attorney, Agent, or Firm—Deborah M. Altman

(57) ABSTRACT

An aqueous dispersion including polymeric microparticles which are prepared in a medium substantially free of organic solvent from a mixture of one or more reaction products of polymerizable, ethylenically unsaturated monomers, and one or more reactive organopolysiloxanes is provided. Pigmented film-forming compositions, curable compositions and topcoats of multi-component composite coating composition containing the above-described dispersions also are provided. The substantially solvent-free film-forming compositions of the invention are storage stable at room temperature and provide coatings with excellent application properties such as sag resistance and tack-free overspray, and excellent performance properties such as hardness and scratch resistance. The film-forming compositions are suitable for wet-on-wet application over a base coat with little or no mudcracking.

39 Claims, No Drawings

SOLVENT-FREE FILM-FORMING COMPOSITIONS, COATED SUBSTRATES AND METHOD RELATED THERETO

FIELD OF THE INVENTION

The present invention relates to aqueous dispersions and to curable compositions containing the same. More particularly, the present invention relates to multi-component composite coating compositions comprising a pigmented base coat and a transparent topcoat applied over the base coat which is deposited from a substantially solvent-free film-forming composition comprising an aqueous dispersion of polymeric microparticles. The invention also relates to substrates coated with such compositions.

BACKGROUND OF THE INVENTION

Color-plus-clear coating systems involving the application of a colored or pigmented base coat to a substrate followed by application of a transparent or clear topcoat over the base coat have become increasingly popular as original finishes for automobiles. The color-plus-clear systems have outstanding appearance properties such as gloss and distinctness of image, due in large part to the clear coat.

The most economically attractive color-plus-clear coating systems are those where the clear coat composition can be applied directly over the uncured colored base coat. The process of applying one layer of a coating before the previous layer is cured, then simultaneously curing both layers, is referred to as a wet-on-wet ("WOW") application. Color-plus-clear coating systems suitable for WOW application provide a substantial energy cost savings advantage.

Over the past decade, there has been a concerted effort to reduce atmospheric pollution caused by volatile solvents that are emitted during the painting process. However, it is often difficult to achieve high quality, smooth coating finishes, particularly clear coating finishes, such as are required in the automotive industry, without including organic solvents which contribute greatly to flow and leveling of a coating. In addition to achieving near-flawless appearance, automotive coatings must be durable and chip resistant, yet economical and easy to apply.

The use of powder coatings to eliminate the emission of volatile solvents during the painting process has become increasingly attractive. Powder coatings have become quite popular for use in coatings for automotive components, for example, wheels, axle parts, seat frames and the like. Use of powder coatings for clear coats in color-plus-clear systems, however, is somewhat less prevalent for several reasons. First, powder coatings require a different application technology than conventional liquid coating compositions and, thus, require expensive modifications to application lines. Also, the high standard of automotive clear coats is, for the most part, set by polyurethane systems, which are typically cured at temperatures below 140° C. Most powder coating formulations require a much higher curing temperature. Further, many powder coating compositions tend to yellow more readily than conventional liquid clear coating compositions, and powder clear coating compositions generally result in clear coatings having a high cured film thickness, typically ranging from 60 to 70 microns.

U.S. Pat. No. 5,379,947 discloses a process for producing a powder coating composition wherein the powder particle size does not exceed 100 micrometers and at least 50 percent of the powder particles are of a size ranging from 3 to 5 micrometers. After milling, the powder is added to a mixture of water and surfactants, followed by the subsequent addition of dispersants and rheology control agents, thereby forming a powder slurry. The powder slurry coating compositions are useful for both base coat and clear coat applications.

Powder in slurry form for automotive clear coatings can overcome many of the disadvantages of dry powder coatings, however, powder slurry compositions often tend to be unstable and settle upon storage at temperatures above 20° C. Further, WOW application of powder slurry clear coating compositions over conventional base coats can result in mudcracking of the system upon curing. See *Aktueller Status bei der Pulverlackentwicklung fur die Automobilindustrie am Beispiel fuller und Klarlack*, presented by Dr. W. Kries at the 1st International Conference of Car-Body Powder Coatings, Berlin, Germany, Jun. 22–23, 1998, reprinted in *Focus on Powder Coatings*, The Royal Society of Chemistry, 2–8, September 1998.

Generally, any film that contains a volatile component such as water must undergo a decrease in volume as the volatile component evaporates from the surface of the film. As the volatile component leaves the film, contraction forces act to pull the film inward in all directions. However, without intending to be bound by any theory, it is believed that if the film has sufficient cohesive strength, the film will contract in only one dimension, that is, the film thickness will decrease, while the film resists contraction in any direction parallel to the substrate surface. By contrast, if a film lacks cohesive strength sufficient to resist contraction parallel to the substrate surface, contraction forces will cause the film to break up into small flat segments that are separated by continuous linear voids. This surface defect is commonly referred to as "mudcracking".

An aqueous coating that forms a powder upon application at ambient temperature cannot readily coalesce to form a generally continuous film until subjected to thermal cure conditions. The tendency of such coatings to form "mudcracks" upon curing is believed to be due to the lack of sufficient cohesive strength resulting from the inability of the powder particles to readily coalesce prior to thermal curing.

Canadian Patent Application No. 2,203,868 discloses a process for preparing aqueous dispersions which form powder coatings at ambient temperature, which, after curing, provide coatings having improved water and solvent resistance. The dispersions are comprised of a polyol component having a $T_g$ of greater than 30° C., which optionally may be hydrophilically modified, and a blocked isocyanate crosslinker, which optionally may be hydrophilically modified. The dispersion components are prepared in the presence of organic solvent that must be removed by a distillation step. Although applied as conventional waterborne coating compositions, these dispersions form powder coatings at ambient temperature. As discussed above, however, since these materials are in powder form at ambient temperature, they can exhibit mudcracking upon curing.

U.S. Pat. No. 5,071,904 discloses a waterborne coating composition, which comprises a dispersion of polymeric microparticles in an aqueous medium. The microparticles contain a substantially hydrophobic polymer, which is essentially free of repeating acrylic or vinyl units in the backbone and is adapted to be chemically bound into the cured coating composition. The disclosed microparticles do not comprise a hydrophobic crosslinker, that is, a crosslinker such as a fully butylated melamine that is not soluble or dispersible in water. Moreover, the coating compositions, while waterborne, typically contain a substantial amount of organic solvent to provide flow and coalescence to the applied coating.

The automotive industry would derive a significant economic benefit from an essentially solvent-free clear coating composition that meets the stringent automotive appearance requirements, while maintaining performance properties, such as acid etch and scratch resistance. Additionally, it would be economically beneficial to provide an aqueous dispersion of polymeric microparticles wherein the polymeric components are prepared in a medium which is free of organic solvent, thereby eliminating the additional process step of distillation stripping. Also, it would be advantageous to provide a solvent-free clear coat composition which can be applied by conventional application means over an uncured pigmented base coating composition (i.e., via WOW application) to form a generally continuous film at ambient temperature thereby providing a cured film which is free of mudcracking.

SUMMARY OF THE INVENTION

The present invention provides an aqueous dispersion comprising polymeric microparticles which comprise (A) at least one functional group-containing reaction product of polymerizable, ethylenically unsaturated monomers and (B) at least one reactive organopolysiloxane. The polymeric microparticles preferably are prepared in a medium substantially free of organic solvent. Also provided are curable compositions containing the above-described dispersion, as well as multi-component composite coating compositions comprising a base coat deposited from a pigmented film-forming composition and at least one transparent topcoat composition applied over the base coat in which the transparent topcoat is deposited from a film-forming composition comprising the above-described dispersion. Coated substrates are also provided.

Other than in the operating examples, or where otherwise indicated, all numbers expressing quantities of ingredients, reaction conditions, and so forth used in the specification and claims are to be understood as being modified in all instances by the term "about". Also, as used herein, the term "polymer" is meant to refer to oligomers and both homopolymers and copolymers.

DETAILED DESCRIPTION OF THE PREFERRED EMBODIMENTS

As discussed above, the aqueous dispersion of the present invention comprises polymeric microparticles comprising (A) at least one functional group-containing reaction product of polymerizable, ethylenically unsaturated monomers and (B) at least one reactive organopolysiloxane. The microparticles are formed in a medium that is substantially free of organic solvent.

As used herein, the term "dispersion" means that the microparticles are capable of being distributed throughout water as finely divided particles, such as a latex. See *Hawley's Condensed Chemical Dictionary*, (12th Ed. 1993) at page 435, which is hereby incorporated by reference. The uniformity of the dispersion can be increased by the addition of wetting, dispersing or emulsifying agents (surfactants), which are discussed below.

The reaction product of ethylenically unsaturated monomers (A) preferably is substantially hydrophilic. As used herein, the term "substantially hydrophilic" means that the reaction product (A) is essentially compatible with, has an affinity for, and/or is capable of dissolving in water using conventional mixing means. That is, upon mixing a sample of the reaction product with an organic component and water, the majority of the reaction product is in the water and a separate organic phase is observed. In order to be substantially hydrophilic, the reaction product must contain acid or ionic functionality sufficient to allow it to form stable dispersions in water. The amount of acid functionality in a resin can be measured by acid value, the number of milligrams of KOH per gram of solid required to neutralize the acid functionality in the resin.

The microparticles preferably comprise, as component (A), at least one acid functional reaction product of ethylenically unsaturated monomers. As used herein, the phrase "acid functional" means that the reaction product (A) can give up a proton to a base in a chemical reaction; a substance that is capable of reacting with a base to form a salt; or a compound that produces hydronium ions, $H_3O^+$, in aqueous solution. See *Hawley's* at page 15 and K. Whitten et al., *General Chemistry*, (1981) at page 192, which are hereby incorporated by reference.

The reaction product (A) can be formed by polymerizing one or more ethylenically unsaturated carboxylic acid functional group-containing monomers and one or more other ethylenically unsaturated monomers free of carboxylic acid functional groups. Preferably, at least one of the other ethylenically unsaturated monomers free of carboxylic acid functional groups contains reactive functional groups, for example hydroxyl and/or carbamate functional groups.

Non-limiting examples of useful ethylenically unsaturated carboxylic acid functional group-containing monomers include (meth)acrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. As used herein, "(meth)acrylic" and like terms is intended to include both acrylic and methacrylic. Preferred ethylenically unsaturated carboxylic acid monomers are (meth)acrylic acids.

Non-limiting examples of useful other ethylenically unsaturated monomers free of carboxylic acid functional groups include vinyl monomers such as alkyl esters of acrylic and methacrylic acids, for example, ethyl (meth)acrylate, methyl (meth)acrylate, butyl (meth)acrylate, 2-ethylhexyl (meth)acrylate, 2-hydroxyethyl (meth)acrylate, hydroxypropyl methacrylate, ethylene glycol dimethacrylate, isobornyl methacrylate and lauryl methacrylate; vinyl aromatics such as styrene and vinyl toluene; acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

In a preferred embodiment of the invention, the ethylenically unsaturated monomers free of carboxylic acid functional groups include ethylenically unsaturated, beta-hydroxy ester functional monomers, for example, those derived from the reaction of an ethylenically unsaturated acid functional monomer, such as a monocarboxylic acid, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those that are commercially available from Shell Chemical Company under the tradename CARDURA E and from Exxon Chemical Company under the tradename GLYDEXX-10.

Alternatively, the beta-hydroxy ester functional monomers are prepared from an ethylenically unsaturated, epoxy functional monomer, for example glycidyl (meth)acrylate and allyl glycidyl ether, and a saturated carboxylic acid such as a saturated monocarboxylic acid, for example isostearic acid.

Acrylic monomers such as butyl acrylate, lauryl methacrylate, or 2-ethylhexyl acrylate are preferred due to the hydrophobic nature and low glass transition temperature ($T_g$) of the polymers that they produce.

Preferably, the reaction product (A) comprises the reaction product of one or more ethylenically unsaturated carboxylic acid functional group-containing monomers selected from the group consisting of acrylic acid and methacrylic acid; and one or more other ethylenically unsaturated monomers free of carboxylic acid functional groups selected from the group consisting of styrene, butyl acrylate, and hydroxypropyl methacrylate. In a preferred embodiment of the invention, the reaction product (A) comprises the reaction product of acrylic acid, a beta-hydroxy ester functional monomer, 2-ethylhexyl acrylate, styrene and hydroxypropyl methacrylate.

Carbamate functional groups may be incorporated into the reaction product (A) by co-polymerizing the ethylenically unsaturated monomers described above with a carbamate functional vinyl monomer, for example a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers are, for instance, the reaction product of hydroxyethyl methacrylate, isophorone diisocyanate, and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328 which is incorporated by reference herein. Pendant carbamate groups can also be incorporated into the reaction product (A) by a "transcarbamoylation" reaction in which a hydroxyl functional reaction product is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid yielding pendant carbamate groups. Note that the production of isocyanic acid is disclosed in U.S. Pat. No. 4,364,913. Likewise, hydroxyl functional reaction products can be reacted with urea to provide pendant carbamate groups.

In a preferred embodiment, the reaction product (A) is formed in situ by free radical-initiated polymerization in the presence of the organopolysiloxane (B) and/or the crosslinking agent (C), which are discussed in detail below. Alternatively, the reaction product (A) can be pre-formed and then dispersed as a mixture with the organopolysiloxane (B) and/or the crosslinking agent (C), if employed, in an aqueous medium by conventional dispersion techniques which are well-known to those skilled in the art. It should be noted that when the reaction product (A) is prepared in situ, the final reaction product is taken to have the same composition, characteristics and physical properties as if pre-formed under conventional free-radical polymerization conditions.

Suitable methods for homo- and co-polymerizing ethylenically unsaturated monomers and/or other additional polymerizable monomers and pre-formed polymers are well known to those skilled in the art of polymers and further discussion thereof is not believed to be necessary in view of the present disclosure. For example, polymerization of the ethylenically unsaturated monomers can be carried out in bulk, in aqueous or organic solvent solution such as benzene or n-hexane, in emulsion, or in aqueous dispersion. *Kirk-Othmer Encyclopedia of Chemical Technology*, Vol. 1 (1963) at page 305. The polymerization can be effected by means of a suitable initiator system, including free-radical initiators such as benzoyl peroxide or azobisisobutyronitrile, anionic initiation and organometallic initiation. Molecular weight can be controlled by choice of solvent or polymerization medium, concentration of initiator or monomer, temperature, and the use of chain transfer agents. If additional information is needed, such polymerization methods are disclosed in *Kirk-Othmer*, Vol. 1 at pages 203–205, 259–297 and 305–307, which is hereby incorporated by reference.

The number average molecular weight of the reaction product (A) can range from 5,000 to 10,000,000, and preferably 10,000 to 500,000 and more preferably from 10,000 to 50,000. Unless indicated otherwise, molecular weights, as used herein and in the claims, are expressed as number average molecular weights as determined by gel permeation chromatography using a polystyrene standard.

The glass transition temperature ($T_g$) of the reaction product (A) is typically less than 100° C., preferably less than 75° C., more preferably less than 50° C., even more preferably less than 30° C., and most preferably less than 25° C. The $T_g$ of the reaction product (A) is also typically at least –50° C., preferably at least –25° C., more preferably at least –20° C., even more preferably at least –10° C., and most preferably at least 0° C. The $T_g$ of the reaction product (A) can range between any combination of these values inclusive of the recited ranges.

The amount of the reaction product (A) present in the thermosettable dispersion typically ranges from at least 10 to at least 20 weight percent, preferably from at least 20 to at least 30 weight percent, and more preferably from at least 30 to at least 40 weight percent based on total resin solids weight of the thermosettable dispersion. The amount of the reaction product (A) present in the thermosettable dispersion typically ranges from less than 90 to less than 80 weight percent, preferably less than 80 to less than 70 weight percent, and more preferably less than 70 to less than 60 weight percent based on total resin solids weight of the thermosettable dispersion. The amount of the reaction product (A) present in the thermosettable dispersion can range between any combination of these values inclusive of the recited ranges.

The microparticles also comprise (B) one or more reactive organopolysiloxanes which preferably is substantially hydrophobic. As used herein, the term "substantially hydrophobic" means that the hydrophobic component essentially is not compatible with, does not have an affinity for and/or is not capable of dissolving in water using conventional mixing means. That is, upon mixing a sample of hydrophobic component with an organic component and water, a majority of the polymer is in the organic phase and a separate aqueous phase is observed. See *Hawley's Condensed Chemical Dictionary*, (12th Ed. 1993) at page 618. In order for the organopolysiloxane to be substantially hydrophobic, it must not contain enough acid or ionic functionality to allow it to form stable dispersions in water. Preferably, the acid value of the organopolysiloxane is below 20, more preferably the acid value is below 10, and most preferably below 5. Substantially hydrophobic organopolysiloxanes having low acid values can be considered to be water-dispersible if they contain other hydrophilic components such as hydroxyl groups or poly(ethylene oxide) groups. However, it should be understood that for purposes of the present invention, such polymers are not considered to be substantially hydrophobic if they are water-dispersible, regardless of their acid value.

The reaction product (A) and/or the reactive organopolysiloxane (B) are preferably adapted to be reactive with a hydrophobic crosslinking agent (C) (discussed below), as well as chemically bound into the opposite coating when it is cured, i.e., the components (A) and/or (B) are residually reactive in the sense that they can contain residual reactive functional groups (which remain present after components (A) and/or (B) are reacted, if desired, with a hydrophobic crosslinking agent (C)) capable of reacting with other components of the film-forming composition. These residual functional groups are capable of reacting, for example, with a hydrophilic crosslinking agent that can be present in the film-forming composition, or, alternatively, with other film-forming resins which also can be present.

The reactive organopolysiloxane (B) contains reactive functional groups, preferably selected from the group consisting of hydroxyl, carboxylic acid, isocyanate and blocked isocyanate, primary amine, secondary amine, amide, carbamate, urea, urethane, alkoxysilane, vinyl and epoxy functional groups. In a preferred embodiment of the invention, the reactive organopolysiloxane has the following structure (I):

where m and n each represent a positive number fulfilling the requirements of: $0<n<4$; $0<m<4$; and $2 \leq (m+n)<4$; $R^1$ represents H, OH or monovalent hydrocarbon groups; and $R^2$ represents a monovalent reactive functional group-containing organic moiety. Preferably, $R^2$ represents a reactive group containing moiety selected from the group consisting of hydroxyl, carboxylic acid, isocyanate and blocked isocyanate, primary amine, secondary amine, amide, carbamate, urea, urethane, alkoxysilane, vinyl and epoxy functional groups.

The reactive organopolysiloxanes which are preferred for use as component (B) in the film-forming compositions of the invention have the following structure (II) or (III):

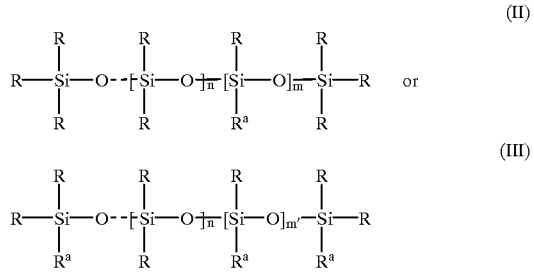

where m has a value of at least 1; m' ranges from 0 to 50; n ranges from 0 to 50; R is selected from the group consisting of H, OH or monovalent hydrocarbon groups bonded to the silicon atoms; and $R^a$ comprises the following structure (IV):

wherein $R_1$ is alkylene, oxyalkylene or alkylene aryl; and X comprises a functional group-containing moiety, which preferably comprises the reactive functional groups described above. In a preferred embodiment of the invention, X comprises hydroxyl and/or carbamate functional groups and (n+m) and (n+m') represent values ranging from 2 to 3.

Suitable examples of the reactive organopolysiloxane (B) include reactive functional group-containing polysiloxanes, such as the hydroxyl, carboxylic acid and amine functional group-containing polysiloxanes disclosed in U.S. Pat. Nos. 5,916,992 and 5,939,491 and co-pending U.S. Pat. Ser. No. 08/986,812 filed Dec. 8, 1997, U.S. Pat. No. 6,033,545 all which are incorporated herein by reference. These functional group-containing polysiloxanes typically are the hydrosilylation reaction products of a polysiloxane containing silicon hydride and a functional group-containing material having at least one unsaturated bond capable of undergoing hydrosilylation reaction. For example, 1,1,3,3-tetramethyl disiloxane and/or polymethyl polysiloxane having two or more Si—H groups can be reacted with one or more hydroxyl group-containing materials having at least one unsaturated bond capable of undergoing hydrosilylation reaction. Nonlimiting examples of suitable hydroxyl group-containing materials having at least one unsaturated bond include trimethylolpropane monoallyl ether, pentaerythritol monoallyl ether, trimethylolpropane diallyl ether, polyethoxylated allyl alcohol, and polypropoxylated allyl alcohol.

The amount of the reactive organopolysiloxane (B) present in the thermosettable dispersion typically ranges from greater than 1.0 to greater than 5 weight percent, preferably from greater than 5 to greater than 10 weight percent, and more preferably greater than 10 to greater than 20 weight percent based on total resin solids weight of the thermosettable dispersion. The amount of the reactive organopolysiloxane (B) present in the thermosettable dispersion generally ranges from less than 90 to less than 80 weight percent, preferably less than 80 to less than 70 weight percent, and more preferably less than 70 to less than 60 weight percent based on total resin solids weight of the thermosettable dispersion. The amount of the reactive organopolysiloxane (B) present in the thermosettable dispersion can range between any combination of these values inclusive of the recited ranges.

The polymeric microparticles preferably contain at least one crosslinking agent (C) which contains reactive functional groups. The reaction product (A) and/or the organopolysiloxane (B) can contain functional groups which are adapted to be reactive with the functional groups of the crosslinking agent (C). The crosslinking agent (C) preferably is hydrophobic. Selection of crosslinking agents suitable for use in the thermosettable dispersions of the present invention is dependent upon the reactive functional groups associated with components (A) and/or (B).

As discussed above, the organopolysiloxane (B) preferably is also substantially hydrophobic. Without intending to be bound by theory, it is believed that the presence of the hydrophobic organopolysiloxane (B) and/or the hydrophobic crosslinking agent (C) (which otherwise are not water soluble or dispersible) within the microparticles results in a waterborne coating which efficiently releases water from the surface of the coating upon application to a substrate and, therefore, exhibits flow and leveling properties generally equivalent to conventional solvent-borne coatings without running or "sagging" on vertical surfaces.

Crosslinking agents suitable for crosslinking hydroxyl and/or carbamate functional group-containing materials include aminoplast resins. Aminoplast resins are based on the condensation products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro4,6-diamino-1,3,5-triazine, 6-methyl-2,4-diamino-1,3,5-triazine, 3,5-diaminotriazole, triaminopyrimidine, 2-mercapto4,6-diaminopyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins preferably contain methylol or other alkylol groups, and in most instances at least a portion of these alkylol groups are etherified by a reaction with an alcohol to provide organic solvent soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols, and halogen-substituted or other substituted alcohols, such as 3-chloropropanol and butoxyethanol. Commonly employed aminoplast resins are substantially alkylated with methanol or butanol. Preferred aminoplast resins for use as the crosslinking agent (C) in the thermosettable dispersion of the present invention include those which are fully alkylated with butanol, such as CYMEL 1156 which is commercially available from Cytec Industries, Inc.

Other useful crosslinking agents include polyisocyanates which are useful for crosslinking hydroxyl and/or amine functional group-containing materials. Polyisocyanates which are preferred for use as the crosslinking agent (C) in the present invention are blocked diisocyanates. Examples of suitable diisocyanates which can be utilized herein include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures, that is, at temperatures ranging from 80 to 200° C. Suitable blocking agents can include lower aliphatic alcohols such as methanol, oximes such as methyl ethyl ketoxime and lactams such as caprolactam.

Also known in the art for crosslinking hydroxyl functional group-containing materials are triazine compounds such as the tricarbamoyl triazine compounds described in detail in U.S. Pat. No. 5,084,541, which is incorporated herein by reference.

If desired, mixtures of the above crosslinking agents can be used.

The amount of the crosslinking agent (C) present in the thermosettable dispersion prior to crosslinking with the functional groups of the reaction product (A) and the organopolysiloxane (B) typically is at least 5 to at least 15 weight percent, preferably at least 15 to at least 25 weight percent, and more preferably at least 25 to at least 35 weight percent based on total resin solids weight of the thermosettable dispersion. The amount of the crosslinking agent (C) present in the thermosettable dispersion typically is also less than 90 to less than 80 weight percent, preferably less than 80 to less than 70 weight percent, and more preferably less than 70 to less than 60 weight percent based on total resin solids weight of the thermosettable dispersion. The amount of the crosslinking agent (C) present in the dispersion can range between any combination of these values inclusive of the recited ranges.

In a preferred embodiment, the dispersion of polymeric microparticles in an aqueous medium is prepared by a high stress technique which is described more fully below. First, the ethylenically unsaturated monomers utilized to prepare the microparticle are thoroughly mixed with the aqueous medium and the organopolysiloxane (B) and the crosslinker (C) if present. For the present application, the ethylenically unsaturated monomers together with the reactive organopolysiloxane (B) and the crosslinker (C) are referred to as the organic component. The organic component generally also comprises other organic species and preferably is substantially free of organic solvent, i.e., no more than 20 percent of organic solvent is present. The mixture is then subjected to high shear conditions in order to particulate it into microparticles which are uniformly of a fine particle size. The mixture is subjected to a stress sufficient to result in a dispersion such that after polymerization less than 20 percent of the polymer microparticles have a mean diameter greater than 5 micrometers as determined using a particle size analyzer as described in further detail below.

The dispersion of polymeric microparticles is prepared by mixing together the above-described components under high shear conditions. As used herein, the term "high shear conditions" is meant to include not only high stress techniques, such as by the liquid-liquid impingement techniques discussed in detail below, but also high speed shearing by mechanical means. It should be understood that, if desired, any mode of applying stress to the pre-emulsification mixture can be utilized so long as sufficient stress is applied to achieve the requisite particle size distribution, that is, such that after polymerization less than 20 percent of the polymeric microparticles have a mean diameter greater than 5 micrometers.

The dispersions of the present invention typically are prepared as oil-in-water emulsions. That is, the aqueous medium provides the continuous phase of dispersion in which the polymeric microparticles are suspended as the organic phase. Alternatively, the dispersions can be prepared as water-in-oil emulsions, where the organic components provide the continuous phase in which the aqueous phase is dispersed.

The aqueous medium is generally exclusively water. However, for some polymer systems, it can be desirable to also include a minor amount of inert organic solvent which can assist in lowering the viscosity of the polymer to be dispersed. For example, if the organic phase has a Brookfield viscosity greater than 1000 centipoise at 25° C. or a W Gardner-Holdt viscosity, some solvent can be used. Examples of suitable solvents which can be incorporated in the organic component are benzyl alcohol, xylene, methyl isobutyl ketone, mineral spirits, butanol, butyl acetate, tributyl phosphate and dibutyl phthalate. Organic solvents may also be employed to dissolve or solubilize the organosiloxane component to aid incorporation into the pre-emulsification mixture.

As was mentioned above, the mixture is preferably subjected to the appropriate stress by use of a MICROFLUIDIZER® emulsifier which is available from Microfluidics Corporation in Newton, Mass. The MICROFLUIDIZER® high-pressure impingement emulsifier is disclosed in U.S. Pat. No. 4,533,254, which is hereby incorporated by reference. The device consists of a high-pressure (up to $1.4 \times 10^5$ kPa (20,000 psi)) pump and an interaction chamber in which emulsification takes place. The pump forces the mixture of reactants in aqueous medium into the chamber where it is split into at least two streams which pass at very high velocity through at least two slits and collide, resulting in the particulation of the mixture into small particles. Generally, the reaction mixture is passed through the emulsifier once at a pressure of between $3.5 \times 10^4$ and $1 \times 10^5$ kPa (5,000 and 15,000 psi). Multiple passes can result in smaller average particle size and a narrower range for the particle size distribution. When using the aforesaid MICROFLUIDIZER® emulsifier, stress is applied by liquid-liquid impingement as has been described. However, as mentioned above, if desired, other modes of applying stress to the pre-emulsification mixture can be utilized, so long as sufficient stress is applied to achieve the requisite particle size distribution. For example, one alternative manner of applying stress would be the use of ultrasonic energy.

Stress is described as force per unit area. Although the precise mechanism by which the MICROFLUIDIZER® emulsifier stresses the pre-emulsification mixture to particulate is not thoroughly understood, it is theorized that stress is exerted in more than one manner. It is believed that one manner in which stress is exerted is by shear, that is, the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occur violently over a short time period and produce intense stress. Although not intending to be bound by any particular theory, it is believed that both shear and cavitation contribute to producing the stress which particulates the pre-emulsification mixture.

Once the mixture has been particulated into microparticles, the polymerizable species within each particle are polymerized under conditions sufficient to produce polymer microparticles which are stably dispersed in the aqueous medium. Preferably, a surfactant or dispersant is present to stabilize the dispersion. The surfactant is preferably present when the organic component referred to above is mixed into the aqueous medium prior to particulation. Alternatively, the surfactant can be introduced into the medium at a point just after the particulation within the MICROFLUIDIZER® emulsifier. The surfactant, however, can be an important part of the particle forming process and is often necessary to achieve the requisite dispersion stability. The surfactant also can be employed to prevent the emulsified particles from forming agglomerates.

Examples of suitable surfactants include the dimethylethanolamine salt of dodecylbenzene sulfonic acid, sodium dioctylsulfosuccinate, ethoxylated nonylphenol and sodium dodecylbenzene sulfonate. Other materials well known to those skilled in the art are also suitable for use herein. Generally, both ionic and non-ionic surfactants are used together and the amount of surfactant ranges from 1 percent to 10 percent, preferably from 2 percent to 4 percent, the percentage based on the total solids. One particularly preferred surfactant for the preparation of aminoplast curable dispersions is the dimethylethanolamine salt of dodecylbenzene sulfonic acid.

In order to conduct the polymerization of the ethylenically unsaturated monomers, a free-radical initiator is usually present. Both water soluble and oil soluble initiators can be used. Since the addition of certain initiators, such as redox initiators, can result in a strong exothermic reaction, it is generally desirable to add the initiator to the other ingredients immediately before the reaction is to be conducted. Examples of water soluble initiators include ammonium peroxydisulfate, potassium peroxydisulfate and hydrogen peroxide. Examples of oil soluble initiators include t-butyl hydroperoxide, dilauryl peroxide, t-butyl perbenzoate and 2,2'-azobis(isobutyronitrile). Preferably redox initiators such as ammonium peroxydisulfate/sodium metabisulfite or t-butylhydroperoxide/isoascorbic acid are utilized herein.

It should be understood that in some instances it can be desirable for some of the reactant species to be added after particulation of the remaining reactants and the aqueous medium, for example, water soluble acrylic monomers such as hydroxypropyl methacrylate.

The particulated mixture is then subjected to conditions sufficient to induce polymerization of the polymerizable species within the microparticles. The particular conditions will vary depending upon the actual materials being polymerized. The length of time required to complete polymerization typically varies from 10 minutes to 6 hours. The progress of the polymerization reaction can be followed by techniques conventionally known to those skilled in the art of polymer chemistry. For example, heat generation, monomer concentration and percent of total solids are all methods of monitoring the progress of the polymerization.

The aqueous microparticle dispersions can be prepared by a batch process or a continuous process. In one example of a batch process, the unreacted microdispersion is fed over a period of 1 to 4 hours into a heated reactor initially charged with water. The initiator can be fed in simultaneously, it can be part of the microdispersion or it can be charged to the reactor before feeding in the microdispersion. The optimum temperature depends upon the specific initiator being used. The length of time typically ranges from 2 hours to 6 hours.

In an alternative batch process, a reactor vessel is charged with the entire amount of microdispersion to be polymerized. Polymerization commences when an appropriate initiator such as a redox initiator is added. An appropriate initial temperature is chosen such that the heat of polymerization does not increase the batch temperature beyond the boiling point of the ingredients. Thus for large-scale production, it is preferred that the microdispersion have sufficient heat capacity to absorb the total amount of heat being generated.

In a continuous process, the pre-emulsion or mixture of raw materials is passed through the homogenizer to make a microdispersion which is immediately passed through a heated tube, e.g., stainless steel, or a heat exchanger in which polymerization takes place. The initiator is added to the microdispersion just before it enters the tubing.

It is preferred to use redox type initiators in the continuous process since other initiators can produce gases such as nitrogen or carbon dioxide which can cause the latex to spurt out of the reaction tubing prematurely. The temperature of reaction can range from 25° C. to 80° C., preferably 35° C. to 45° C. The residence time typically ranges from 5 minutes to 30 minutes.

The tubing in which the reaction occurs is not required to heat the microdispersion but rather to remove the heat being generated. Once the initiator has been added, the reaction begins spontaneously after a short induction period and the reaction exotherm resulting from the polymerization will rapidly raise the temperature.

If there is still free monomer remaining after all of the initiator is consumed, an additional amount of initiator can be added to scavenge the remaining monomer.

Once the polymerization is complete, the resultant product is a stable dispersion of polymer microparticles in an aqueous medium, wherein both the reaction product formed from the ethylenically unsaturated monomers and the substantially hydrophobic organopolysiloxane and hydrophobic crosslinking agent are contained within each microparticle. The aqueous medium, therefore, is substantially free of water soluble polymer. The resultant polymeric microparticles are, of course, insoluble in the aqueous medium. As used herein, "substantially free" means that the aqueous medium contains less than 30 percent by weight of dissolved polymer, preferably less than 15 percent.

By "stably dispersed" is meant that the polymeric microparticles do not settle upon standing and do not coagulate or flocculate upon standing. Typically, when diluted to 50 percent total solids, the microparticle dispersions do not settle even when aged for one month at room temperature.

As was stated above, a very important aspect of the polymeric microparticle dispersions is that the particle size is uniformly small, i.e., after polymerization less than 20 percent of the polymeric microparticles have a mean diameter which is greater than 5 micrometers, more preferably greater than 1 micrometer. Generally, the microparticles have a mean diameter from 0.01 micrometers to 10 micrometers. Preferably the mean diameter of the particles after polymerization ranges from 0.05 micrometer to 0.5 micrometer. The particle size can be measured with a particle size analyzer such as the Coulter N4 instrument commercially available from Coulter.

The microparticle dispersions are high solids materials of low viscosity. Dispersions can be prepared directly with a total solids content of from 45 percent to 60 percent. They can also be prepared at a lower solids level of 30 to 40 percent total solids and concentrated to a higher level of solids of 55 to 65 percent by stripping. The molecular weight of the polymer and viscosity of the claimed aqueous dispersions are independent of each other. The weight average molecular weight can range from a few hundred to greater than 100,000. The Brookfield viscosity also can vary widely from 0.01 poise to 100 poise, depending on the solids and composition, preferably from 0.2 to 5 poise when measured at 25° C. using an appropriate spindle at 50 RPM.

Although not intending to be bound by any particular theory, it is believed that microparticles can have a core/shell morphology if suitable hydrophilic group-containing materials are included in the mixture used to produce reaction product (A), the organopolysiloxane (B) and/or the hydrophobic crosslinking agent (C). Due to their hydrophobic nature, the organopolysiloxane (B) and the hydrophobic crosslinking agent (C) will tend to be incorporated into the interior, or "core", of the microparticle and the hydrophilic monomer(s) used to prepare the reaction product (A) will tend to be incorporated into the exterior, or "shell", of the microparticles. Suitable hydrophilic monomers include, for example, acrylic acid, methacrylic acid, vinyl acetate, N-methylol acrylamide, hydroxyethyl acrylate, and hydroxypropyl methacrylate. As mentioned in U.S. Pat. No. 5,071,904, it may be desirable to add water soluble monomer(s) after the other components of the dispersion of polymeric microparticles have been particularized into microparticles.

Acrylic acid is a particularly useful hydrophilic monomer for use in the present invention. In order to obtain the advantages of a high solids waterborne coating composition, the coating composition should have sufficiently low viscosity to allow adequate atomization of the coating during spray application. The viscosity of the film-forming composition can be controlled partially by choosing components and reaction conditions that control the amount of hydrophilic polymer in the aqueous phase and in the shell of the polymeric microparticles. Interactions among microparticles, and consequently the rheology of coatings containing them, are greatly affected by the ionic charge density on the surface of the microparticles. Charge density can be increased by increasing the amount of acrylic acid polymerized into the shell of a microparticle. The amount of acrylic acid incorporated into the shell of a microparticle can also be increased by increasing the pH of the aqueous medium in which the polymerization takes place.

Dispersions of polymeric microparticles containing more than 5 percent by weight of acrylic acid, or having an acid value greater than 40 if acid functional monomers other than acrylic acid are used, are generally too viscous to provide high solids coating compositions. The preferred amount of acrylic acid is generally between 1 and 3 percent by weight of the total polymer in the dispersion or latex. Therefore, the acid value of the polymer in the dispersion of polymeric microparticles is preferably between 8 and 24.

The microparticle can be internally crosslinked, if desired, by including at least one ethylenically unsaturated monomer which has more than one reactive site of unsaturation. Suitable monomers which have more than one reactive site of unsaturation include ethylene glycol dimethacrylate, which is preferred, allyl methacrylate, hexanediol diacrylate, methacrylic anhydride, tetraethylene glycol diacrylate, tripropylene glycol diacrylate, and the like. When the microparticle is non-crosslinked, the polymer(s) can be either linear or branched. When the microparticles are internally crosslinked via an ethylenically unsaturated monomer which has more than one reactive site of unsaturation, the microparticles are referred to as a microgel. Non-crosslinked microparticles are generally preferred. However, when crosslinked microparticles are used, a low degree of internal crosslinking, such as would be obtained when ethylene glycol dimethacrylate is present in an amount ranging from one to three percent by weight of the total resin solids in the dispersion, is preferred.

In an alternative embodiment discussed briefly above, the reaction product (A), organopolysiloxane (B), and the hydrophobic crosslinking agent (C) can be mixed without the use of a MICROFLUIDIZER® in an aqueous medium by conventional dispersion techniques which are well-known to those skilled in the art.

The multi-component composite coating composition of the present invention comprises a base coat deposited from a pigmented film-forming composition and a transparent topcoat applied over the base coat. The transparent topcoat is deposited from a substantially solvent-free film-forming composition. By "substantially solvent-free" is meant that the amount of organic solvent present in the composition is less than 10 weight percent, preferably less than 5 weight percent, and more preferably less than 2 weight percent based on total weight of the film-forming composition to provide low volatile organic emissions during application. It should be understood, however, that a small amount of organic solvent can be present in the composition, for example to improve flow and leveling of the applied coating or to decrease viscosity as needed.

The topcoat film-forming composition forms a generally continuous film at ambient conditions (approximately 23–28° C. at 1 atmosphere pressure). A "generally continuous film" is formed upon coalescence of the applied coating composition to form a uniform coating upon the surface to be coated. By "coalescence" is meant the tendency of individual particles or droplets of the coating composition, such as would result upon atomization of a liquid coating when spray applied, to flow together thereby forming a continuous film upon the substrate which is substantially free from voids or areas of very thin film thickness between the coating particles.

The topcoat film-forming composition comprises at least one thermosettable aqueous dispersion comprising polymeric microparticles as described above and, preferably, at least one hydrophilic crosslinking agent reactive with the functionality of the microparticles.

The amount of the thermosettable dispersion resin solids present in the film-forming composition of the present invention typically ranges from at least 20 to at least 30 weight percent, preferably from at least 30 to at least 40 weight percent, and more preferably from at least 40 to at least 50 weight percent based on total resin solids weight of the film-forming composition. The amount of the thermosettable dispersion present in the film-forming composition of the invention also can range from less than 90 to less than 85 weight percent, preferably less than 85 to less than 80 weight percent, and more preferably less than 80 to less than 70 weight percent based on total resin solids weight of the film-forming composition. The amount of the thermosettable dispersion present in the film-forming composition can range between any combination of these values inclusive of the recited ranges.

The film-forming composition also can further comprise one or more hydrophilic crosslinking agents which are adapted to react with the functional groups of the polymeric microparticles to provide additional curing, if desired, for the film-forming composition. Non-limiting examples of suitable crosslinking agents include hydrophilic aminoplasts and polyisocyanates as described generally above which are adapted to be water soluble or water dispersible as described below, are polyacids, polyanhydrides and mixtures thereof. The crosslinking agent or mixture of crosslinking agents used in the film-forming composition is dependent upon the functionality associated with the polymer microparticles, such as hydroxyl and/or carbamate functionality. Preferably, the functionality is hydroxyl and the crosslinking agent is a hydrophilic aminoplast or polyisocyanate.

As aforementioned, the crosslinking agents which are useful as a component in the topcoat film-forming composition of the invention must be hydrophilic, that is, they must be adapted to be water soluble or water dispersible. For example, aminoplast resins suitable for use as the hydrophilic crosslinking agent can include those which contain methylol or similar alkylol groups, a portion of which have been etherified by reaction with a lower alcohol, preferably methanol, to provide a water soluble/dispersible aminoplast resin. Exemplary of the preferred aminoplast resin is the partially methylated aminoplast resin, CYMEL 385, which is commercially available from Cytec Industries, Inc. An example of a hydrophilic blocked isocyanate suitable for use as the hydrophilic crosslinking agent is dimethyl pyrazole blocked hexamethylene diisocyanate trimer commercially available as BI 7986 from Baxenden Chemicals, Ltd. in Lancashire, England.

Polyacid crosslinking materials suitable for use in the present invention on average generally contain greater than one acid group per molecule, more preferably three or more and most preferably four or more, such acid groups being reactive with epoxy functional film-forming polymers. Preferred polyacid crosslinking materials have di-, tri- or higher functionalities. Suitable polyacid crosslinking materials which can be used include carboxylic acid group-containing oligomers, polymers and compounds, such as acrylic polymers, polyesters, and polyurethanes and compounds having phosphorus-based acid groups.

Examples of suitable polyacid crosslinking agents include ester group-containing oligomers and compounds including half-esters formed from reacting polyols and cyclic 1,2-acid anhydrides or acid functional polyesters derived from polyols and polyacids or anhydrides. These half-esters are of relatively low molecular weight and are quite reactive with epoxy functionality. Suitable ester group-containing oligomers are described in U.S. Pat. No. 4,764,430, column 4, line 26 to column 5, line 68, which is hereby incorporated by reference.

Other useful hydrophilic crosslinking agents include acid-functional acrylic crosslinkers made by copolymerizing methacrylic acid and/or acrylic acid monomers with other ethylenically unsaturated copolymerizable monomers as the polyacid crosslinking material. Alternatively, acid-functional acrylics can be prepared from hydroxy-functional acrylics reacted with cyclic anhydrides.

Preferred hydrophilic crosslinking agents include hydrophilic aminoplast resins or blocked polyisocyanates.

The hydrophilic crosslinking agent can be present in the film-forming composition in an amount ranging from 0 to at least 10 weight percent, preferably at least 10 to at least 20 weight percent, and more preferably from at least 20 to at least 30 weight percent based on total resin solids weight in the film-forming composition. The crosslinking agent is also typically present in the film-forming composition in an amount ranging from less than 70 to less than 60 weight percent, preferably from less than 60 to less than 50 weight percent, and more preferably from less than 50 to less than 40 weight percent based on total resin solids weight of the film-forming composition. The hydrophilic crosslinking agent can be present in the film-forming composition in an amount ranging between any combination of these values inclusive of the recited ranges The film-forming composition can contain, in addition to the components described above, a variety of other adjuvant materials. If desired, other resinous materials can be utilized in conjunction with the dispersion of polymeric microparticles so long as the resultant coating composition is not detrimentally affected in terms of application, physical performance and properties.

Such adjuvant materials can include, for example, amphiphilic adjuvants which have a water soluble, generally hydrophilic polar end and a water-insoluble, generally hydrophobic hydrocarbon end. Such adjuvants can be present as a compound consisting of a single molecular species, an oligomer or a polymer, but preferably is an oligomer having a number average molecular weight ranging from 200 to 3000 grams per mole, and more preferably 300 to 800 grams per mole, as determined by gel permeation chromatography using polystyrene as a standard.

Such adjuvant materials are preferably essentially free of acid functionality, i.e., it has an acid value of less than 30 mg KOH/g adjuvant, preferably less than 20 mg KOH/g adjuvant, more preferably less than 10 mg KOH/g adjuvant, and most preferably less than 5 mg KOH/g adjuvant.

The adjuvant has one or more terminal hydrophilic groups positioned at its water soluble polar end. Suitable hydrophilic groups include hydroxyl groups which are preferred, carbamate groups, amide groups, urea groups and mercaptan groups. One or more or combinations of these groups can be present as pendant functional groups along the backbone of the adjuvant. Preferably, the hydrophilic polar end of the adjuvant has one or more, and preferably an average of one to three, terminal hydroxyl groups.

The hydrocarbon end of the adjuvant can be a pendant or terminal end group, but preferably is a terminal end group positioned generally opposite to the water soluble polar end of the adjuvant. The hydrocarbon end of the adjuvant comprises at least six contiguous carbon atoms, preferably in a linear hydrocarbon chain and preferably is free of hydrophilic functional groups.

Such adjuvant materials can be saturated or unsaturated, branched or unbranched, and can include functional groups such as ester groups and/or ether groups and/or other functional groups containing nitrogen, oxygen, or sulfur. Preferably such functional groups are not positioned near the hydrophobic end.

Such adjuvant materials can be prepared by esterification of reactants comprising one or more monocarboxylic acids and one or more polyols, preferably in a 1:1 molar ratio. Suitable monocarboxylic acids include heptanoic acid, caprylic acid, pelargonic acid, capric acid, n-undecylic acid, lauric acid, myristic acid, palmitic acid, margaric acid, stearic acid, isostearic acid, arachidic acid, behenic acid, lignoceric acid, cerotic acid, oleic acid, elaidic acid, linoleic acid, linolenic acid, dihydroxystearic acid, ricinoleic acid and isomers and mixtures thereof. Useful polyols include 1,4-butanediol, 1,6-hexanediol, neopentyl glycol, ethylene glycol, diethylene glycol, 2,3-butylene glycol, glycerol, trimethylolpropane, ditrimethylolpropane, pentaerythritol, sorbitol, mannitol and mixtures thereof. The polyol can include terminal groups such as short chain alkyl groups having 1 to 4 carbon atoms or amido groups.

Non-limiting examples of adjuvant materials prepared by the above esterification reaction include trimethylolpropane monoisostearate, di-trimethylolpropane isostearate, pentaerythritol isostearate and pentaerythritol diisostearate.

Additional reactants can be included in the reaction, such as one or more polycarboxylic acids, polyfunctional amines, polyfunctional isocyanates and mixtures thereof. Useful polycarboxylic acids include 1,4-cyclohexane dicarboxylic acid, dimer fatty acids, and other carboxylic acids such as are disclosed in U.S. Pat. No. 5,468,802 at column 2, lines 49–65 which are incorporated by reference herein. A useful mixture of isomers of 1,4-cyclohexane dicarboxylic acid is commercially available as EASTMAN® 1,4-CHDA from Eastman Kodak. For preparing a reaction product of isostearic acid, trimethylolpropane and 1,4-cyclohexane dicarboxylic acid, a high purity grade of EASTMAN® 1,4-CHDA having approximately 80:20 cis:trans isomers is preferred, although the "R" grade having 60:40 cis:trans also can be used. An example of a suitable adjuvant prepared by the above reaction using a polyfunctional amine instead of a polycarboxylic acid is stearyl diethanolamide.

Generally, if present, the polycarboxylic acid is present as an additional reactant in an amount of less than 50 weight percent on a basis of total weight of the reactants from which the adjuvant reaction product is prepared, preferably less than 30 weight percent and, more preferably, less than 20 weight percent.

The esterification reaction is carried out in accordance with techniques which are well known to those skilled in the art of polymer chemistry and a detailed discussion is not believed to be necessary. Generally, the reaction can be conducted by combining the ingredients and heating to a temperature of 160° C. to 230° C. Further details of the esterification process are disclosed in U.S. Pat. No. 5,468,802 at column 3, lines 4–20 and 39–45, which are incorporated by reference herein.

Alternatively, the adjuvant material can be prepared from the reaction of one or more polycarboxylic acids, one or more polyols and one or more hydrocarbon alcohols comprising at least six contiguous carbon atoms in a manner well known to one skilled in the art. An example of this reaction is the formation of an oligomeric ester from phthalic anhydride, pentaerythritol and stearyl alcohol. Suitable polycarboxylic acids and polyols are discussed above. Useful hydrocarbon alcohols include heptyl alcohol, octyl alcohol, pelargonic alcohol, n-decyl alcohol, n-undecyl alcohol, lauryl alcohol, myristyl alcohol, cetyl alcohol, margaryl alcohol, stearyl alcohol, isostearyl alcohol, n-nonadecyl alcohol, arachidyl alcohol, ceryl alcohol, palmitoleyl alcohol, oleyl alcohol, linoleyl alcohol, linolenyl alcohol, ricinoleyl alcohol and mixtures thereof.

Alternatively, the adjuvant can be prepared by reacting one or more amines comprising at least six contiguous carbon atoms and one or more reactants selected from carbonates or polycarboxylic acids and polyols in a manner well known to the skilled artisan. A non-limiting example is the reaction product of stearyl amine with glycerin carbonate to form n-stearyl dihydroxypropyl carbamate. Another example is the oligoamide-ester reaction product of stearyl amine with isophthalic acid and pentaerythritol. Useful amines include heptyl amine, octyl amine, pelargonyl amine, n-decyl amine, n-undecyl amine, lauryl amine, myristyl amine, cetyl amine, margaryl amine, stearyl amine, n-nonadecyl amine, arachidyl amine, and isomers and mixtures thereof. Suitable polycarboxylic acids and polyols are discussed above.

In yet another alternative embodiment, the adjuvant material can be prepared by reacting one or more monocarboxylic acids with one or more epoxides, such as the glycidyl ether of versatic acid or glycidol, in a manner well known to one skilled in the art. A non-limiting example of an adjuvant prepared according to this reaction is the reaction product of isostearic acid and glycidol. Useful monocarboxylic acids are discussed above.

The adjuvant of the present invention can be added to the topcoat film-forming composition "neat"; that is, it is added by itself or it can be blended with other resinous ingredients, or with solvents or other diluents prior to incorporation into the top coat film-forming composition.

Examples of other suitable adjuvant materials include aliphatic, low molecular weight urethane diol oligomers such as K-Flex® UD-350W available from King Industries.

Generally, if employed, the adjuvant material is present in an amount ranging from 0.01 to 25 weight percent on a basis of total resin solids of the topcoat film-forming composition, preferably 0.1 to 20 weight percent and, more preferably, 0.1 to 15 weight percent.

Other suitable adjuvant materials include hydrophilic reactive functional group-containing polysiloxanes, for example, the hydroxyl, carboxylic acid and amine functional group-containing polysiloxanes disclosed in U.S. Pat. Nos. 5,916,992 and 5,939,491 and co-pending U.S. Pat. Ser. No. 08/986,812 filed Dec. 8, 1997, which are incorporated herein by reference. It should be understood that the polysiloxanes which are useful in the compositions of the present invention as adjuvant materials must be hydrophilic, that is, they are or have been adapted to be water soluble or water dispersible.

In addition, inorganic microparticles which, preferably, are substantially colorless, such as silica, for example, colloidal silica, to provide enhanced mar and scratch resistance can be present. Other suitable inorganic microparticles include fumed silica, amorphous silica, alumina, colloidal alumina, titanium dioxide, zirconia, colloidal zirconia and mixtures thereof. These materials can constitute up to 30 percent by weight of the total weight of the film-forming composition.

The solids content of the topcoat film-forming composition generally ranges from 30 to 75 weight percent on a basis of total weight of the film-forming composition, preferably 35 to 65 weight percent, and more preferably 40 to 60 weight percent.

The film-forming composition preferably also contains a catalyst to accelerate the cure reaction, for example, between the aminoplast curing agent and the reactive hydroxyl and/or carbamate functional groups of the thermosettable dispersion. Examples of suitable catalysts include acidic materials, for example, acid phosphates such as phenyl acid phosphate, and substituted or unsubstituted sulfonic acids such as dodecylbenzene sulfonic acid or paratoluene sulfonic acid. The catalyst usually is present in an amount ranging from 0.1 to 5.0 percent by weight, preferably 0.5 to 1.5 percent by weight, based on the total weight of resin solids.

Other additive ingredients, for example, plasticizers, surfactants, thixotropic agents, anti-gassing agents, flow controllers, anti-oxidants, UV light absorbers and similar additives conventional in the art can be included in the composition. These ingredients typically are present in an amount of up to 40 percent by weight based on the total weight of resin solids.

The film-forming compositions of the invention also can be advantageously formulated to include pigment to prepare substantially solvent-free, pigmented film-forming compositions. These pigmented film-forming compositions also are suitable for use in automotive multi-component composite coating compositions as the pigmented base coating composition, or as a primer coating or as a monocoat.

As aforementioned, the multi-component composite coating compositions of the present invention comprise a pigmented film-forming composition serving as a base coat (i.e., a color coat) and a film-forming composition applied over the base coat serving as a transparent topcoat (i.e., a clear coat). The base coat and clear coat compositions used in the multi-component composite coating compositions of the invention are preferably formulated into liquid high solids coating compositions, that is, compositions containing 40 percent, preferably greater than 50 percent by weight resin solids. The solids content is determined by heating a sample of the composition to 105° to 110° C. for 1 to 2 hours to drive off the volatile material, and subsequently measuring relative weight loss.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds and polyurethanes such as those discussed in detail above.

The resinous binders for the base coat can be organic solvent-based materials such as those described in U.S. Pat. No. 4,220,679, note column 2 line 24 continuing through column 4, line 40, which is incorporated herein by reference. Also, water-based coating compositions such as those described in U.S. Pat. No. 4,403,003, U.S. Pat. No. 4,147, 679 and U.S. Pat. No. 5,071,904 (incorporated herein by reference) can be used as the binder in the base coat composition.

The base coat composition contains pigments as colorants. Suitable metallic pigments include aluminum flake, copper or bronze flake and metal oxide coated mica. Besides the metallic pigments, the base coat compositions can contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green.

Optional ingredients in the base coat composition include those which are well known in the art of formulating surface coatings, such as surfactants, flow control agents, thixotropic agents, fillers, anti-gassing agents, organic co-solvents, catalysts, and other customary auxiliaries. Examples of these materials and suitable amounts are described in U.S. Pat. Nos. 4,220,679, 4,403,003, 4,147,769 and 5,071,904, which are incorporated herein by reference.

The base coat compositions can be applied to the substrate by any conventional coating technique such as brushing, spraying, dipping or flowing, but they are most often applied by spraying. The usual spray techniques and equipment for air spraying, airless spray and electrostatic spraying in either manual or automatic methods can be used.

During application of the base coat to the substrate, the film thickness of the base coat formed on the substrate is typically 0.1 to 5 mils (2.54 to 127 micrometers), preferably 0.1 to 2 mils (2.54 to 50.4 micrometers).

After forming a film of the base coat on the substrate, the base coat can be cured or alternately given a drying step in which solvent is driven out of the base coat film by heating or an air drying period before application of the clear coat. Suitable drying conditions will depend on the particular base coat composition, and on the ambient humidity if the composition is water-borne, but preferably, a drying time of from 1 to 15 minutes at a temperature of 75° to 200° F. (21° to 93° C.) will be adequate.

The solids content of the base coating composition generally ranges from 15 to 60 weight percent, and preferably 20 to 50 weight percent.

The transparent topcoat (or clear coat) composition is typically applied to the base coat by spray application, however, the topcoat can be applied by any conventional coating technique as described above. Any of the known spraying techniques can be used such as compressed air spraying, electrostatic spraying and either manual or automatic methods. As mentioned above, the topcoat can be applied to a cured or to a dried base coat before the base coat has been cured. In the latter instance, the two coatings are then heated to cure both coating layers simultaneously. Typical curing conditions range from 265° to 350° F. (129° to 175° C.) for 20 to 30 minutes. The clear coating thickness (dry film thickness) is typically 1 to 6 mils (25.4 to 152.4 micrometers).

During application of the clear coating composition to the substrate, ambient relative humidity generally can range from 30 to 80 percent, preferably 50 percent to 70 percent.

In an alternative embodiment, after the base coat is applied (and cured, if desired), multiple layers of transparent coatings can be applied over the base coat. This is generally referred to as a "clear-on-clear" application. For example, one or more layers of a conventional transparent or clear coat can be applied over the base coat as an "intermediate topcoat" and one or more layers of transparent coating of the present invention applied thereon. Alternatively, one or more layers of a transparent coating of the present invention can be applied over the base coat as an intermediate topcoat, and one or more conventional transparent coatings applied thereover.

The multi-component composite coating compositions can be applied over virtually any substrate including wood, metals, glass, cloth, plastic, foam, including elastomeric substrates and the like. They are particularly useful in applications over metals and elastomeric substrates that are found on motor vehicles. The substantially solvent-free topcoat film-forming compositions of the present invention provide multi-component composite coating systems that have appearance and performance properties commensurate with those provided by solvent-based counterparts with appreciably less volatile organic emissions during application.

Illustrating the invention are the following examples which, however, are not to be considered as limiting the invention to their details. Unless otherwise indicated, all parts and percentages in the following examples, as well as throughout the specification, are by weight.

EXAMPLES

Example A describes the preparation of a hydrophobic blocked isocyanate crosslinker for use in the preparation of the microparticle dispersions of the present invention. Example B describes the preparation of a pre-blend of inorganic microparticles in the form of colloidal silica and a reactive organopolysiloxane having hydroxyl functional groups. Example C describes the preparation of a thermosettable aqueous dispersion of polymeric microparticles containing the blocked isocyanate crosslinker of Example A and the silica/organopolysiloxane pre-blend of Example B. Example 1 describes the preparation of a transparent topcoat which contains the aqueous dispersion of Example C.

Example A

Hydrophobic Blocked Isocyanate Crosslinker

The hydrophobic crosslinker was prepared in a suitably equipped reaction vessel from a mixture of the following ingredients:

| CHARGE 1: | |
|---|---|
| 388.0 g | Isocyanurate of hexamethylene diisocyanate |
| 224.6 g | Styrene |
| 2.2 g | 2,6-Di-t-butyl-4-methyl phenol |
| CHARGE 2: | |
| 192.2 g | 3,5-Dimethyl pyrazole |
| RINSE: | |
| 25.0 | Styrene |

Charge 1 was heated to 60° C. under a nitrogen cap. Charge 2 was then added in three portions over a 1 hour period, while keeping the reaction temperature below 90° C. At that time the rinse was added and the reaction was held for an additional 1 hour period, during which time the disappearance of free isocyanate was monitored by infrared spectroscopy. The final product was a clear liquid having a Gardner-Holdt viscosity of S-T and a non-volatile content of 1.9% (measured at 110° C. for one hour).

Example B

This example describes the preparation of an organopolysiloxane having hydroxyl functional groups which is subsequently used to prepare a pre-blend of inorganic microparticles (in the form of colloidal silica).

Preparation Of An Organopolysiloxane Having Hydroxyl Functional Groups

This example describes the preparation of polysiloxane polyol which is the hydrosilylation reaction product of a pentasiloxane with an approximate degree of polymerization of 3 to 4, i.e., $(Si-O)_3$ to $(Si-O)_4$. The polysiloxane polyol was prepared from the following mixture of ingredients:

| Ingredients: | Equivalent Weight | Equivalents | Parts By Weight (grams) |
|---|---|---|---|
| Charge I: | | | |
| Trimethylolpropane monoallyl ether | 174.0 | 9.4 | 1630.0 |
| Charge II: | | | |
| MASILWAX BASE[1] | 156.7[2] | 9.4 | 1467.4 |
| Charge III: | | | |
| Chloroplatinic acid | | | 10 ppm |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids was added at ambient conditions and 15 the temperature was gradually increased to 75° C. under a nitrogen blanket. At that temperature, 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Preparation Of Polysiloxane/Silica Blend

A four-neck reaction flask equipped for vacuum distillation was flushed with $N_2$. To the reaction flask was added 150.7 g of the above-described organopolysiloxane polyol and 375 g of colloidal silica[1]. The resulting mixture was vacuum distilled at 25° C. for a period of 2 hours at which time an additional 450 g of organopolysiloxane polyol was added. Vacuum was reapplied for an additional 5 hour period.

[1]Organosilicasol MA-ST, Available from Nissan Chemicals.

Example C

Polymeric Microparticle Dispersion Containing Hydrophobic Crosslinker and Organopolysiloxane/Silica Blend A pre-emulsion was prepared by stirring together the following ingredients:

| Weight (grams) | Material |
| --- | --- |
| 428.1 | Water |
| 17.4 | IGEPAL CO-436[1] |
| 6.5 | TERGITOL NP-9[2] |
| 57.8 | Hydrophobic Crosslinker of Example A |
| 96.2 | Siloxane/Silica blend of Example B |
| 81.0 | CYMEL 1156[3] |
| 43.5 | Styrene |
| 40.6 | Hydroxypropyl methacrylate |
| 24.3 | 2-ethyl hexyl acrylate |
| 75.0 | β-Hydroxy ester functional monomer[4] |
| 6.1 | Tertiary dodecyl mercaptan |
| 2.0 | Acrylic acid |
| 1.6 | Dibutyl tin dilaurate |

[1]Anionic surfactant commercially available from Rhone-Poulenc.
[2]Nonylphenoxy polyethoxy ethanol, a non-ionic surfactant commercially available from Union Carbide Chemicals.
[3]A fully butylated melamine-formaldehyde resin commercially available from Cytec Industries Inc.
[4]The reaction product of acrylic acid and glycidyl neodecanoate.

The pre-emulsion was passed once through a MICROFLUIDIZER® M110T at 5000 psi and transferred to a four-neck round bottom flask equipped with an overhead stirrer, condenser, thermometer, and a nitrogen atmosphere. 71.5 g of water used to rinse the MICROFLUIDIZER® was added to the flask that was then heated to 40° C. The polymerization was initiated by adding 1.0 g sodium formaldehyde sulfoxylate then 1.4 g of tertiary butyl hydroperoxide (70% in water) over a 10 minute period. The temperature of the reaction increased from 40° C. to 52° C. The temperature was then reduced to below 30° C. at which time 4.9 g of 50% aqueous dimethylethanolamine was added. The final pH of the dispersion was 6.39, the nonvolatile content was 38.6%, and the Brookfield viscosity was 24 cps (spindle #2, 60 rpm).

Example 1

Transparent Topcoat Film-Forming Composition Containing the Microparticle Dispersion of Example C With Hydrophilic Blocked Isocyanate and Melamine Crosslinkers A transparent topcoat film-forming composition was prepared by mixing under mild agitation the following ingredients:

| | |
| --- | --- |
| 1.80 g | ASE-60[1] |
| 1.10 g | 50% aqueous dimethylethanolamine |
| 350.0 g | Siloxane/acrylic microparticle dispersion of Example C |

[1]Associative thickener commercially available from Rotin's Haas of Philadelphia, Pennsylvania.

The ASE-60 and the dimethylethanolamine were added under mild agitation to the microparticle dispersion and the resulting admixture was stirred for 20 minutes. The resulting film-forming composition had a pH of 8.28, a non-volatile content of 38.6%, and a viscosity of 20 seconds as measured using a #4 Ford cup.

The appearance and physical properties of panels coated with the transparent topcoat film-forming composition of this example were evaluated versus a solvent-borne two pack isocyanate clear coat commercially available from BASF Corp. as B+K HVP 15000/SC29-0317 0109 (Comparative Example). The test substrates were ACT cold roll steel panels 10.2 cm by 30.5 cm (4 inch by 12 inch) electrocoated with a cationic electrodepositable primer commercially available from PPG Industries, Inc. as ED-5000. The panels were primed with a commercially available PPG primer surfacer coded as GPXH5379 and cured for 30 minutes at 325° F. The panels were then coated with a silver base coat (commercially available from PPG Industries Lacke GmbH as 16-173-9983) which was spray applied (two coats automated spray with 30 seconds ambient flash between coats) at 60% relative humidity and 70° F. The panels were flash baked for 5 minutes at 80° C. to give a dry film thickness of 11 micrometers. After application of the clear coat composition (single coat automated spray at 60% relative humidity and 70° F.), the panels were flashed for 2.5 minutes at room temperature then baked for 10 minutes at 45° C. and for an additional 30 minutes at 140° C. to give a dry film thickness of 37 micrometers for the clear coat composition of this example and 38 to 43 micrometers for the Comparative Example.

The appearance and physical properties of the coated panels were measured as follows. Specular gloss was measured at 20° with a Novo Gloss Statistical Glossmeter from Gardco where higher numbers indicate better performance. The smoothness of the clear coats was measured using a Byk Wavescan in which results are reported as long wave and short wave numbers where lower values mean smoother films. Reported VOC values were calculated according to the following formula:

$$VOC = \frac{[[(1 - \text{percent total solids}) - \text{percent water}] \times \text{lb/gal}]}{[1 - ((\text{percent water} \times \text{lb/gal})/8.33)]}$$

Mar resistance was measured using the Atlas AATCC Mar Test Model CM-5 and BON-AMI abrasive cleaner. The clear coat was abraded and the gloss of the abraded sections measured using the Novo-Gloss Meter. Duplicate results were averaged and compared with the gloss of the original coating. A rating of 0% means complete abrasion of the film and a rating of 100% means no damage. Adhesion was tested as follows: cutting through the coating in a crosshatch pattern with a sharp knife, using a cut interval of 2 millimeters, (six vertical cuts with six horizontal cuts perpendicular to the vertical cuts, resulting in a 10 mm×10 mm grid of 2 mm×2 mm squares), applying tape (#4651 black tape from Beirsdorf) over the cut portion, sharply pulling off the tape at a 60° angle from the coating surface, and estimating the percentage of the transparent topcoating removed with the tape. No loss of adhesion is given a 0% rating and total loss of adhesion is given a 100% rating. Table 1 provides the measured properties:

TABLE 1

| | Example C | Solventborne 2k Comparative Example |
| --- | --- | --- |
| Gloss of clear coat at 20° | 92 | 91 |
| Adhesion | 0% loss | 0% loss |
| Gloss retention (post mar) | 74% | 52% |
| VOC | <1.0 lb/gal | ~4.0 lb/gal |
| % Solvent | <1% | ~45% |

The data presented in Table 1 above illustrate that the substantially solvent-free transparent topcoat film-forming composition of the present invention (which has a VOC content of less than 1.0 lbs/gal) provides appearance and adhesion properties similar to those of the commercial solvent-borne clear coat of the Comparative Example (which has a VOC content of >4.0 lbs/gal.). The substantially solvent-free film-forming composition of the invention, however, provides a significant improvement in mar resistance properties over the solvent-borne Comparative Example.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore we claim:

1. An aqueous dispersion comprising polymeric microparticles comprising the following components:
   (A) at least one functional group-containing reaction product of polymerizable, ethylenically unsaturated monomers;
   (B) at least one reactive functional group-containing organopolysiloxane having the following structure (II) or (III):

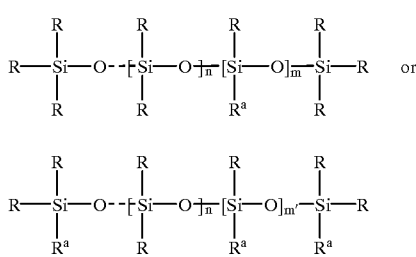

wherein m has a value of at least 1; each of (n+m) and (n+m') ranges from 2 to 3; R is selected from the group consisting of H, OH and monovalent hydrocarbon groups bonded to the silicon atoms; and $R^a$ comprises the following structure (IV):

wherein $R_1$ is alkylene, oxyalkylene or alkylene aryl; and X comprises a functional group-containing moiety; and
   (C) at least one hydrophobic crosslinking agent comprising functional groups reactive with the functional groups of (A) and/or (B), said hydrophobic crosslinking agent comprising at least one compound selected from blocked isocyanates, aminoplast resins, and mixtures thereof.

2. The dispersion of claim 1, wherein the polymeric microparticles are prepared in a medium substantially free of organic solvent.

3. The dispersion of claim 1, wherein the polymeric microparticles contain functional groups selected from the group consisting of hydroxyl, carbamate, carboxylic acid, isocyanate and blocked isocyanate, primary amine, secondary amine, amide, urea, urethane, alkoxysilane, vinyl and epoxy groups and mixtures thereof.

4. The dispersion of claim 1, wherein component (A) comprises the reaction product of the following reactants:
   (i) at least one carboxylic acid functional group-containing, ethylenically unsaturated monomer; and
   (ii) at least one ethylenically unsaturated monomer which is free of carboxylic acid functional groups.

5. The dispersion of claim 4, wherein reactant (i) is selected from the group consisting of (meth)acrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof.

6. The dispersion of claim 4, wherein reactant (ii) is selected from the group consisting of alkyl esters of (meth)acrylic acid, vinyl aromatic monomers, acrylamides, acrylonitriles, dialkyl esters of maleic acid and fumaric acid, vinyl halides, vinyl acetate, vinyl ethers, allyl ethers, allyl alcohols, derivatives thereof and mixtures thereof.

7. The dispersion of claim 6, wherein the reactant (ii) comprises a hydroxyalkyl ester of (meth)acrylic acid.

8. The dispersion of claim 4, wherein the reactant (ii) comprises an ethylenically unsaturated beta-hydroxy ester functional monomer.

9. The dispersion of claim 8, wherein the beta-hydroxy ester functional monomer comprises the reaction product of reactants selected from the group consisting of:
   (a) an ethylenically unsaturated, epoxy functional monomer and a saturated carboxylic acid having from 13 to 20 carbon atoms; and
   (b) an ethylenically unsaturated, acid functional monomer and an epoxy compound containing at least 5 carbon atoms which is not polymerizable with the ethylenically unsaturated acid functional monomer.

10. The dispersion of claim 1, wherein the reaction product (A) is formed by free radical polymerization in the presence of the organopolysiloxane (B).

11. The dispersion of claim 1, wherein the reaction product (A) has an acid value ranging from 2 to 50 mg KOH/g.

12. The dispersion of claim 1, wherein the reaction product (A) is present in the dispersion in an amount ranging from 10 to 90 weight percent based on total weight of resin solids weight present in the dispersion.

13. The dispersion of claim 1, wherein the reactive organopolysiloxane (B) is substantially hydrophobic.

14. The dispersion of claim 1, wherein the reactive organopolysiloxane (B) contains reactive functional group selected from the group consisting of hydroxyl, carboxylic acid, isocyanate and blocked isocyanate, primary amine, secondary amine, amide, carbamate, urea, urethane, alkoxysilane, vinyl and epoxy functional groups and mixtures thereof.

15. The dispersion of claim 1, wherein X comprises at least one functional group selected from the group consisting of hydroxyl, carboxylic acid, isocyanate and blocked isocyanate, primary amine, secondary amine, amide, carbamate, urea, urethane, alkoxysilane, vinyl, and epoxy functional groups and mixtures thereof.

16. The dispersion of claim 1, wherein X comprises functional groups selected from the group consisting of hydroxyl groups, carbamate groups, and mixtures thereof.

17. The dispersion of claim 1, wherein the reactive orgaopolysiloxane (B) is present in the dispersion in an amount ranging from 1 to 70 weight percent based on total weight of resin solids present in the dispersion.

18. The dispersion of claim 1, wherein the polymeric microparticles are internally crosslinked.

19. The dispersion of claim 1, wherein the crosslinker (C) is present in the dispersion in an amount ranging from 5 to 70 weight percent based on total weight of resin solids present in the dispersion.

20. The dispersion of claim 1, further comprising substantially inorganic microparticles ranging in size from 1 to 1000 nanometers prior to incorporation into the dispersion.

21. The dispersion of claim 20, wherein the inorganic microparticles are selected from the group consisting of fumed silica, amorphous silica, colloidal silica, alumina, colloidal alumina, titanium dioxide, zirconia, colloidal zirconia, and mixtures thereof.

22. A curable composition comprising:
an aqueous dispersion of polymeric microparticles, said microparticles having a functionality adapted to react with a crosslinking agent and being prepared in a medium substantially free of organic solvent from a mixture of the following components:
(1) at least one reaction product of polymerizable, ethylenically unsaturated monomers;
(2) at least one reactive functional group-containing organopolysiloxane having the following structure (II) or (III):

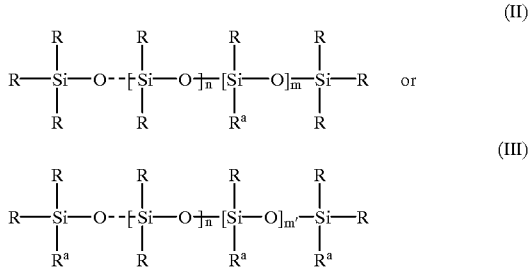

wherein m has a value of at least 1; each of (n+m) and (n+m') ranges from 2 to 3; R is selected from the group consisting of H, OH and monovalent hydrocarbon groups bonded to the silicon atoms; and $R^a$ comprises the following structure (IV):

wherein $R_1$ is alkylene, oxyalkylene or alkylene aryl; and X comprises a functional group-containing moiety; and
(3) at least one hydrophobic crosslinking agent having reactive functional groups, said hydrophobic crosslinking agent comprising at least one compound selected from blocked isocyanates, aminoplast resins, and mixtures thereof, wherein components (1) and/or (2) contain functional groups reactive with the functional groups of (3).

23. The curable composition of claim 22, wherein the polymeric microparticles contain functional groups selected from the group consisting of hydroxyl, carbamate, carboxylic acid, isocyanate and blocked isocyanate, primary amine, secondary amine, amide, urea, urethane, alkoxysilane, vinyl and epoxy groups and mixtures thereof.

24. The curable composition of claim 22, wherein component (1) comprises acid functional groups.

25. The curable composition of claim 24, wherein component (1) comprises the reaction product of the following reactants:
(A) at least one carboxylic acid functional group-containing, ethylenically unsaturated monomer; and
(B) at least one ethylenically unsaturated monomer which is free of carboxylic acid functional groups.

26. The curable composition of claim 25, wherein the reactant (B) comprises a hydroxyalkyl ester of (meth)acrylic acid.

27. The curable composition of claim 25, wherein the reactant (B) comprises an ethylenically unsaturated beta-hydroxy ester functional monomer.

28. The curable composition of claim 27, wherein the beta-hydroxy ester functional monomer comprises the reaction product of reactants selected from the group consisting of:
(a) an ethylenically unsaturated, epoxy functional monomer and a saturated carboxylic acid having from 13 to 20 carbon atoms; and
(b) an ethylenically unsaturated, acid functional monomer and an epoxy compound containing at least 5 carbon atoms which is not polymerizable with the ethylenically unsaturated acid functional monomer.

29. The curable composition of claim 22, wherein the reaction product (1) is present in the dispersion in an amount ranging from 20 to 90 weight percent based on total weight of resin solids present in the dispersion.

30. The curable composition of claim 22, wherein the reactive organopolysiloxane (2) is substantially hydrophobic.

31. The curable composition of claim 22, wherein the reactive organopolysiloxane (2) contains reactive functional group selected from the group consisting of hydroxyl, carbamate, carboxylic acid, isocyanate and blocked isocyanate, primary amine, secondary amine, amide, urea, urethane, alkoxysilane, vinyl, and epoxy functional groups and mixtures thereof.

32. The curable composition of claim 1, wherein X comprises at least one functional group selected from the group consisting of hydroxyl, carboxylic acid, isocyanate and blocked isocyanate, primary amine, secondary amine, amide, carbamate, urea, urethane, alkoxysilane, vinyl and epoxy functional groups and mixtures thereof.

33. The curable composition of claim 1, wherein X comprises functional groups selected from the group Consisting of hydroxyl groups, carbamate groups and mixtures thereof.

34. The curable composition of claim 22, wherein the reactive organopolysiloxane (2) is present in the dispersion in an amount ranging from 1 to 70 weight percent based on total weight of resin solids present in the dispersion.

35. The curable composition of claim 22, wherein the crosslinker (3) is present in the dispersion in an amount ranging from 5 to 70 weight percent based on total weight of resin solids present in the dispersion.

36. The curable composition of claim 22, further comprising at least one hydrophilic crosslinking agent reactive with the functionality of the microparticles.

37. The curable composition of claim 22, further comprising substantially inorganic microparticles ranging in size from 1 to 1000 nanometers prior to incorporation into the curable composition.

38. The curable composition of claim 37, wherein the iorganic microparticles are selected from the group consisting of fumed silica, amorphous silica, colloidal silica, alumina, colloidal alumina, titanium dioxide, zirconia, colloidal zirconia, and mixtures thereof.

39. The curable composition of claim 22, further comprising at least one pigment.

* * * * *